United States Patent [19]
Robins

[11] 3,849,885
[45] Nov. 26, 1974

[54] TOOTH ALIGNER

[76] Inventor: Lenford L. Robins, 1420 St. Peters Ave., Bronx, N.Y. 10461

[22] Filed: Dec. 28, 1973

[21] Appl. No.: 429,073

[52] U.S. Cl. ............................................... 32/14 B
[51] Int. Cl. ............................................. A61c 7/00
[58] Field of Search ......................................... 32/14

[56] References Cited
UNITED STATES PATENTS
3,162,948  12/1964  Gerber ............................... 32/14 E
3,277,892  10/1966  Tepper ............................... 32/16 B Primary Examiner—Robert Peshock
Attorney, Agent, or Firm—Lerner, David, Littenberg & Samuel

[57] ABSTRACT

An improved tooth aligner is disclosed comprising a pair of arcuate tooth aligning members, preferably composed of plastic, and spaced apart so as to permit the insertion of a row of teeth therebetween. Furthermore, the improved tooth aligner disclosed includes a wire support member joining the pair of tooth aligning members into a predetermined tooth aligning orientation, wherein the wire support includes an arcuate forward portion and a pair of support arms extending from the ends thereof to so join the pair of tooth aligning members, as well as a coiled portion disposed on said forward portion and between said support arms, to maintain the forward tooth aligning member in its prescribed arcuate configuration. The support members are disposed at acute angles with respect to the forward portion of the wire support member, in order to maintain these members in a predetermined alignment with respect to each other.

10 Claims, 8 Drawing Figures

PATENTED NOV 26 1974 3,849,885

TOOTH ALIGNER

FIELD OF THE INVENTION

The present invention is concerned with improved tooth aligners. Specifically, this invention is concerned with such tooth aligners for use by dentists and orthodontists in properly aligning a row of teeth, such as by rotating the individual teeth therein. More particularly, the present invention is concerned with a highly portable and easily prepared tooth aligner for such use in properly aligning or straightening a row of teeth whose individual teeth are crooked or out of proper alignment.

BACKGROUND OF THE INVENTION

In the prior art, when a dentist or orthodontist desired to realign a row of teeth which were out of proper alignment, it was necessary to employ complex and cumbersome devices, which required lengthy and cumbersome procedures in order to be properly prepared. Furthermore, it was also often necessary to employ complicated wires and band devices, which are also quite uncomfortable to the user, or other devices which may only be employed for intermittent periods, such as when the user is asleep.

For example, U.S. Pat. No. 2,479,780 discloses a rubber orthodontic appliance for realigning teeth, including an appliance fitted between the upper and lower jaw, and conforming to one such row of teeth. Furthermore, the appliance is prepared so that during home use by the patient it is inserted in the mouth and, in biting, one face of any teeth to be moved engages the surface of the device. Thus, during each bite by the patient, pressure is applied to the tooth in question, tending to move it into a desired spacial relationship. Therefore, such a device may only be employed intermittently by the patient, and is effective only during such biting or pressure applied by him. Furthermore, the patient may not carry out any of his normal activities, such as conversation, eating, etc., while employing this device.

In another such tooth regulating device, U.S. Pat. No. 646,629 discloses a device which avoids the use of ligatures or bands, and includes an elastic plate of vulcanized rubber so constructed so as to press against the improperly aligned teeth in order to rotate and straighten same. As described by the patentee, however, this device requires the preparation of a new plate every few days, in order to continuously apply pressure to the teeth.

There has thus been a continuous search for an improved tooth aligning device, which is easily and inexpensively prepared, and which is highly portable and may be continuously used by the patient, and, further, which does not require the continuous preparation of new devices in order to obtain the proper alignment of the teeth. With this in mind, applicant has provided a tooth aligner as shown in FIG. 1 hereof. This device, including a pair of tooth aligning members, and a wire support structure as shown in FIG. 2 hereof, is prepared in such a manner as to apply continuous pressure to the unaligned teeth in order to obtain their proper alignment. The device itself is easily prepared, and is highly portable. It does not produce many of the disadvantages of the prior art devices reviewed above, including uncomfortable ligatures and bands, and it may be employed continuously without interfering with the patient's normal activities. Furthermore, it may be easily put into position or removed by the patient if he so desires. Thus, while this device prepared by applicant has proven quite successful in this regard, the search has continued for such a device which is capable of providing continuous constant pressure to realign the teeth, and which also possesses the other necessary qualities for such an or appliance, namely, of being highly portable, easily prepared, and not interfering with the patient's normal activities.

It is, therefore, an object of the present invention to provide an improved tooth aligner which overcomes the difficulties of the prior art devices.

It is a further object of the present invention to provide an improved tooth aligner which is highly portable, easily removable by the patient, and which may be used continuously without interfering with the patient's normal activities.

It is yet another object of the present invention to provide such an improved tooth aligner which is capable of imparting constant and continuous pressure to realign an improperly aligned row of teeth.

SUMMARY OF THE INVENTION

In accordance with the present invention, an improved tooth aligner is provided, including substantially arcuate first and second tooth aligning members, said tooth aligning members spaced apart so as to permit the insertion of a row of teeth therebetween. Furthermore, the present tooth aligner includes a wire support member joining said first tooth aligning member to said second tooth aligning member into a predetermined tooth aligning orientation, such that the improperly aligned row of teeth to which the improved tooth aligner is to be applied may be forced into a proper alignment. The improperly aligned row of teeth may include one or more teeth which are out of alignment with the remainder of the row of teeth, or which requires rotation into proper alignment therefrom. The wire support member itself includes a substantially arcuate forward portion which cooperates with the first tooth aligning member, and a pair of support arms extending from the ends of the substantially arcuate forward portion to the second tooth aligning member, again so as to join the first tooth aligning member to the second tooth aligning member into a predetermined tooth aligning orientation. Furthermore, the wire support member includes a coiled portion disposed intermediate of the ends of said substantially arcuate forward portion, for maintaining the first tooth aligning member in its prescribed arcuate configuration. In this manner, it is possible to properly align teeth which are disposed between the first and second tooth aligning members. It has thus been found that the inclusion of a coiled portion upon the substantially arcuate forward portion of the wire support member is highly effective in maintaining the substantially arcuate shape of the first tooth aligning member, and in this manner substantially continuous and constant pressure for realigning the unaligned teeth is provided therewith. The improved tooth aligner of the present invention thus does not require constant replacement, and results in the proper alignment of a row of teeth in a substantially shorter time than those devices previously known.

Such an improved tooth aligner may thus be easily adapted to cooperate with either a row of upper or lower teeth. Preferably, where the forward teeth of a row of lower teeth are to be aligned with the tooth aligner of this invention, it will be prepared in a manner such that the pair of support arms of the wire support member will be positioned distal to the cuspids, that is between the cuspids and first bicuspids, in order to obtain a firm anchorage for the tooth aligner. Similarly, where the forward teeth of a row of upper teeth are to be aligned with the tooth aligner of this invention, it will be prepared so that the support arms are positioned distal to the first bicuspid, or between the first bicuspid and second bicuspid.

In a preferred embodiment of the present invention, the pair of support arms which extend from the ends of the substantially arcuate forward portion of the wire support member are disposed at acute angles with respect to said forward portion of the wire support member. That is, these support arms are disposed at angles of less than 90°, such as those prior art devices described above, and as shown in FIG. 2 hereof. In this manner, it is possible to maintain the pair of support arms and the forward portion of the wire support member in their predetermined alignment with respect to each other and, therefore, to dissipate any force applied thereto tending to separate the pair of support arms from the arcuate forward portion of the wire support member, so as to thereby increase the angle therebetween. The tendency for the pair of support arms to be separated from the arcuate forward portion of the wire support member, that is, for the angle therebetween to be increased, is occasioned by the natural forces applied to the first and second tooth aligning members during use, and as the tooth aligning members are applying the required forces against the unaligned row of teeth. By thus maintaining the acute angle between the pair of support arms and the forward portion of the wire support member, it is again possible to employ the single improved tooth aligner of the present invention, without replacement, to obtain rapid realignment of a row of teeth.

In another highly preferred embodiment of the present invention, the first tooth aligning member will include two tooth retaining portions thereof, and the aforesaid coiled portion of the forward portion of the wire support member will be disposed therebetween. In this manner, the maximum advantage obtainable by the use of the coiled portion, and the retention of the substantially arcuate shape of said forward portion obtainable thereby, is obtained.

In yet another highly preferred embodiment of the present invention, the ends of the first tooth aligning member will extend beyond the point where the support arms extend from the forward portion of the wire support member, and in a manner so as to grip the next succeeding tooth, preferable the first bicuspid where a row of lower teeth is to be aligned and the second bicuspid where a row of upper teeth is to be aligned. The ends of the first tooth aligning member will thus include pairs of tooth-gripping fingers for this purpose.

DETAILED DESCRIPTION

Figure 1:
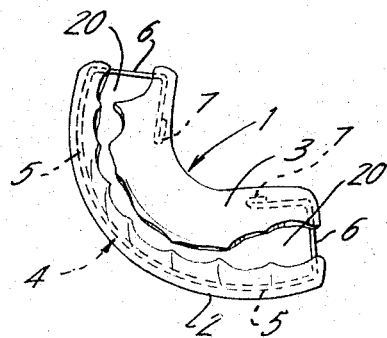
FIG. 1 is a plan view of a tooth aligner of the prior art.
Figure 2:
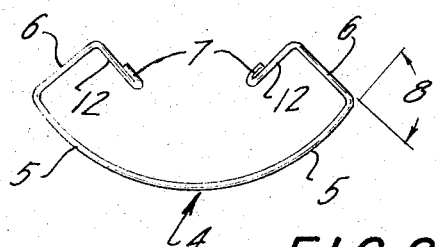
FIG. 2 is a plan view of a wire support member for use in the tooth aligner of the prior art.

Referring to the figures, in which like numerals refer to like parts thereof, FIG. 1 shows applicant's prior art tooth aligner, generally designated 1, including a pair of tooth aligning members, 2 and 3. The first, or forward, tooth aligning member 2, and the second, or rearward tooth aligning member 3, are maintained in a spaced apart relationship, so that a row of teeth may be inserted in the space 20 therebetween. This is accomplished by the use of a wire support member, generally designated 4 in FIG. 2, which thus joins the first and second tooth aligning members 2 and 3. The wire support member, as specifically shown in FIG. 2, includes a substantially arcuate forward portion 5, which cooperates with the first tooth aligning member 2, and a pair of support arms 6, which join said first tooth aligning member 2 to the second tooth aligning member 3. The support arms themselves are substantially L-shaped, and include an elbow portion 12 thereon, terminating in a substantially U-shaped bend 7. The pair of support arms 6 have been disposed at angles of 90° or greater, designated 8, with respect to the arcuate forward portion of the wire support member.

Figure 3:
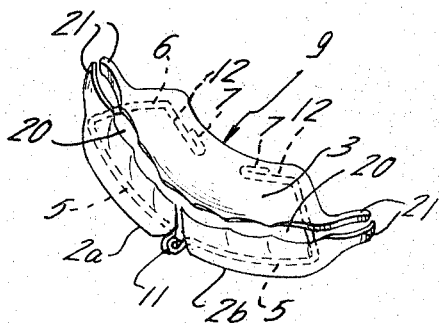
FIG. 3 is a plan view of the improved tooth aligner of the present invention.
Figure 4:
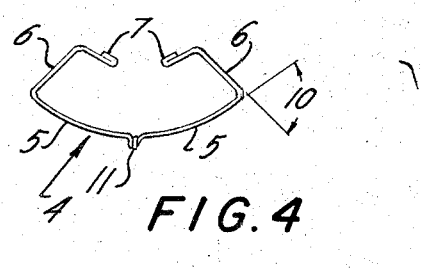
FIG. 4 is a plan view of the wire support member of the improved tooth aligner of the present invention.

Referring to FIGS. 3 and 4, the improved tooth aligner of the present invention, generally designated 9, and its improved wire support member, generally designated 4, are shown therein. The improved tooth aligner 9 includes a first tooth aligning member 2 and a second tooth aligning member 3. In FIG. 3, the first tooth aligning member 2 includes two tooth retaining portions designated 2a and 2b, respectively. These tooth retaining portions may be entirely separate, or may include a narrow bridge portion connecting same.

The pair of tooth aligning members 2 and 3 are maintained in a spaced apart relationship with respect to each other, so as to permit the insertion of a row of teeth in the space 20 therebetween. This is accomplished by employing a wire support member 4. The wire support member 4 includes a substantially arcuate forward portion 5, which cooperates with the first tooth aligning member 2. Thus, the substantially arcuate forward portion 5 of the wire support member 4 may either be attached to or imbedded in the first tooth aligning member 2, or its two tooth retaining portions 2a and 2b. The forward portion 5 of the wire support member 4 and the first tooth aligning member 2 will thus have substantially coextensive arcuate shapes. The wire support member 4 also includes a pair of support arms 6 extending from the ends of the forward portion 5 to the second tooth aligning member 3. Principally, the pair of support arms 6 will be generally L-shaped, including an elbow portion 12 at each end thereof. The pair of support arms will be attached to or imbedded in the second tooth aligning member 3. Each support arm 6 of the wire support member 4 will terminate in a substantially U-shaped bend 7 thereon. Thus, in this manner, the first and second tooth aligning members are maintained in a predetermined tooth aligning orientation, with the improperly aligned row of teeth to be disposed therebetween. The specific method of preparing the improved tooth aligner of the present invention, and the determination of this tooth aligning orientation, will be discussed in detail below. The pair of support arms 6 are disposed at an acute angle 10 with respect to the forward portion 5 of the wire support member 4. This acute angle 10, i.e., less than 90°, thus provides for the maintenance of the pair of support arms 6 and the forward portion 5 of the wire support member 4 in their predetermined alignment with respect to each other, and the prevention of any increase in this angle, or the separation of the pair of support arms 6 from the forward portion 5 of the wire support member 4, as forces are applied thereto during normal use. These forces generally result from the pressure exerted between the improperly aligned teeth and the first and second tooth aligning members during use, as will be discussed in more detail below. The retention of the predetermined orientation or alignment between the pair of support arms 6 and the forward portion 5 of the wire support member 4 thus provides for constant and continuous application of pressure from the pair of tooth aligning members 2 and 3 to the improperly aligned teeth.

The wire support member 4 will also include a coiled portion 11 disposed intermediate of the ends of the substantially arcuate forward portion 5 thereof, so as to maintain the first tooth aligning member in its presecribed arcuate configuration. It has thus been discovered that the inclusion of such a coiled portion 11 upon the forward portion 5 of the wire support member 4 is highly effective in applying a constant and continuous pressure from the first and second tooth aligning members 2 and 3 to the improperly aligned tooth or teeth. By the use of the present improved tooth aligner, including the coiled portion 11 thereon, these forces are maintained substantially constant and the proper alignment of the teeth disposed between the first and second tooth aligning members is obtained in a shorter period of time, and without the necessity for readjusting or replacing the tooth aligner. This is particularly true where the first tooth aligning member 2 includes two tooth retaining members, 2a and 2b, and in which case further bias is imparted thereto, that the first tooth aligning member retains its substantially arcuate shape.

Figure 8:
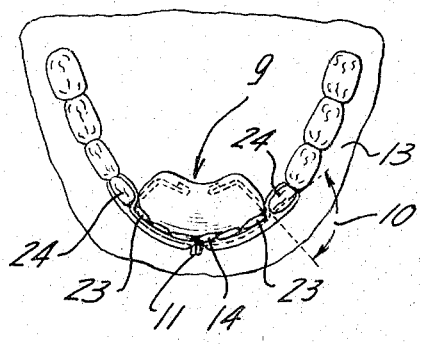
FIG. 8 is a top perspective view of a row of teeth with an improved tooth aligner of the present invention disposed thereon.

Furthermore, it is preferred that the pair of support arms 6 extend between particular teeth, depending upon whether the forward teeth of a row of upper or lower teeth are to be aligned, in order to obtain the firmest possible anchorage of the tooth aligner upon that particular row of teeth. Thus as shown in FIG. 8, where a row of lower teeth are to be aligned the pair of support arms 6 will pass distal to the cuspids 23, or between the cuspids 23 and first bicuspids 24. Similarly, where a row of upper teeth are to be properly aligned, the pair of support arms 6 will pass distal to the first bicuspids, or between the first bicuspids and second bicuspids.

THe first tooth aligning member 2 also includes a pair of tooth-gripping fingers 21 extending from the ends thereof. These tooth-gripping fingers 21 will thus be comprised of the same material as the tooth aligning members, that is preferably plastic or acrylics, and will substantially surround the next succeeding tooth disposed beyond the point where the support arms 6, join the first and second tooth aligning members. Therefore, as discussed above, these fingers 21 will preferably grip the first and second bicuspids where a row of lower and upper tooth, respectively, are to be aligned. Aside from providing firmer anchorage for the tooth aligner, these toothgripping fingers 21 also improve the strength of the tooth aligner, and prevent the ends or corners of the wire support member 4 from wearing through the tooth-aligning members.

Figure 5:
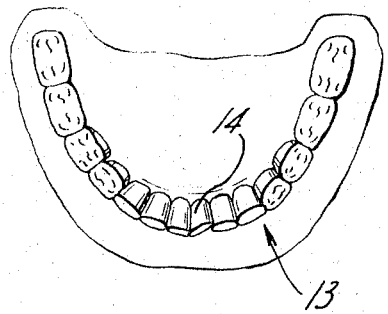
FIG. 5 is a top perspective view of a row of teeth, including an unaligned tooth therein.
Figure 6:
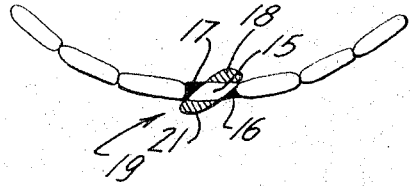
FIG. 6 is an elevational perspective view of a row of teeth, including an improperly aligned tooth therein.

The improved tooth aligner of the present invention may be prepared in the following manner. Initially, an impression is taken of a row of teeth, designated 13 in FIG. 5, including one or more improperly aligned teeth 14 thereon. This impression, generally taken by the dentist or othodontist, is of an impression material such as an alginate, which is inserted, in paste form, into the patient's mouth on a dental tray or mold. As seen in FIG. 5, it is thus desired to rotate the improperly aligned tooth 14 in the row of upper or lower teeth 13 into a proper relationship with the remaining teeth thereof. This impression thus duplicates the row of improperly aligned teeth 13. Further preparation of the improved tooth aligner of the present invention may be better understood with reference to FIG. 6. A mold or duplicate of a portion of a row of teeth, including at least one improperly aligned tooth 15 thereon, is thus shown. This mold or duplicate is prepared from the initial dental impression by various well known procedures, such as by pouring up the impression with a dental stone material or Plaster of Paris, which hardens into the duplicate of the row of teeth, as seen in FIG. 5. Wax is then added to this plaster mold of the improperly aligned tooth 15, as shown in FIG. 6, on the portions of each side thereof into which position the tooth is to be realigned. Thus, with respect to improperly aligned or rotated tooth 15, wax is built up on the side of the forward portion thereof, 16, and on the portion of the rear side thereof, 17, in the direction into which the tooth is to be rotated. Furthermore, plaster is scraped or removed from the plaster mold of the improperly aligned tooth 15 at the portions thereof 18 and 21, from which the improperly aligned tooth is to be rotated. Thus, as shown by the cross-hatching in FIG. 6, plaster is scraped from the rear portion 18 and from the forward portion 21 of the improperly aligned tooth 15, which are to be vacated upon the proper rotation of the improperly aligned tooth 15 into its desired alignment with the remainder of the row of teeth 19. Upon completion of this procedure, the mold will correspond with the row of teeth within its preferred or desired alignment, that is, after the completion of the tooth aligning process. The tooth aligner of the present invention, and specifically the inner shapes of the first and second tooth aligning members 2 and 3 thereof, are thus prepared from this thus treated plaster mold, now including built-up wax portions thereon. Preferably, the first and second tooth aligning members 2 and 3 will be prepared from plastic, most preferably acrylics. The plastic is thus poured onto the mold, and the wire support member 4, in its preferred configuration described above, is set thereon prior to hardening of the previously heat softened plastic. Thus, upon hardening, the first and second tooth aligning members will be of a shape such that a portion thereof will apply significant pressure to those portions of the front and rear sides of the improperly aligned tooth 14 which are to be rotated into a desired alignment with the remaining teeth. Furthermore, their alignment will be facilitated by the presence of hollow or void spaces upon the first and second tooth aligning members into which the improperly aligned tooth is to be rotated. These hollow spaces are a result of the presence of added wax on the portions 16 and 17 of the improperly aligned tooth 15, as described above. No plastic will therefore flow into these locations during preparation of the improved tooth aligner of the present invention.

Figure 7:
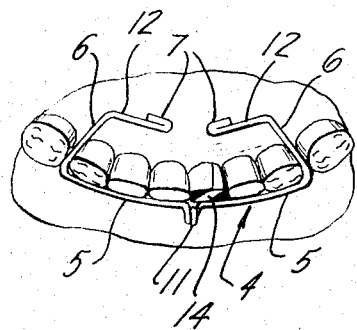
FIG. 7 is a partial top perspective view of a row of teeth shown with the wire support member of the improved tooth aligner of the present invention disposed thereon.

In the preferred method of preparing this improved tooth aligner, subsequent to the above-described process for building up wax and scraping plaster from the plaster mold of the improperly aligned row of teeth 13, the wire support member 4 will be set upon this plaster mold, as seen in FIG. 7, prior to the pouring of the material from which the first and second tooth aligning members 2 and 3, respectively, are to be prepared, preferably acrylics. The final preparation of the tooth aligner, that is subsequent to the pouring of this material, can be seen in FIG. 8. As can thus be seen, the plastic is poured so as to surround each tooth, up to a point approximately midway of the height of each tooth, so that upon setting the row of teeth may be inserted in the space formed therebetween. Furthermore, extra plastic will be poured and molded about the next succeeding teeth following the pair of support arms 6, as described above, in order to prepare the tooth-gripping fingers 21. After hardening, the tooth aligner may thus be removed, and be ready for use by the patient.

The invention may be embodied in other specific forms without departing from the spirt or essential characteristics thereof. The present embodiment is, therefore, to be considered in all respects as illustrative and not restrictive, the scope of the invention being indicated by the appended claims rather than by the foregoing description and all changes which come within the meaning and range of equivalency of the claims are, therefore, intended to be embraced therein.

I claim:

1. An improved tooth aligner comprising
substantially arcuate first and second tooth aligning members, spaced apart to permit the insertion of a row of teeth therebetween, and
wire support means joining said first tooth aligning member to said second tooth aligning member into a predetermined tooth aligning orientation, said wire support means including a substantially arcuate forward portion cooperating with said first tooth aligning member, and a pair of support arms extending from the ends of said forward portion to said second tooth aligning member, and a coiled portion disposed intermediate of said ends of said forward portion for maintaining said first tooth aligning member in its prescribed arcuate configuration, to thereby properly align teeth disposed between said first and second tooth aligning members.

2. The improved tooth aligner of claim 1 wherein said support arms are disposed at acute angles with respect to said forward portion of said wire support means, to thereby maintain said support arms and said forward portion of said wire support means in their predetermined alignment, and to dissipate any force applied thereto tending to separate said support arms from said forward portion of said wire support means.

3. The improved tooth aligner of claim 1 wherein said first and second tooth aligning members comprise plastic.

4. The improved tooth aligner of claim 1 wherein said first tooth aligning member comprises two tooth retaining portions, with said coiled portion disposed therebetween.

5. The improved tooth aligner of claim 2 wherein said first tooth aligning member comprises two tooth retaining portions, with said coiled portion disposed therebetween.

6. The improved tooth aligner of claim 1 wherein said first tooth retaining member includes a pair of tooth-gripping fingers extending from the ends thereof.

7. The improved tooth aligner of claim 1 wherein said support arms are substantially L-shaped.

8. An improved tooth aligner comprising
substantially arcuate first and second tooth aligning members, spaced apart to permit the insertion of a row of teeth therebetween, and
wiere support means joining said first tooth aligning member to said second tooth aligning member into a predetermined tooth aligning orientation, said wire support means including a substantially arcuate forward portion cooperating with said first tooth aligning member, and a pair of support arms extending from the ends of said forward portion to said second tooth aligning member, said support arms being disposed at acute angles with respect to said forward portion of said wire support means, to thereby maintain said support arms and said forward portion of said wire support means in their predetermined alignment, and to dissipate any force applied thereto tending to separate said support arms from said forward portion of said wire support means.

9. The improved tooth aligner of claim 8 wherein said first tooth aligning member comprises two tooth retaining portions.

10. The improved tooth aligner of claim 8 wherein said first tooth aligning member includes a pair of tooth-gripping portions extending from the ends thereof.

* * * * *